(12) United States Patent
Charbonnier et al.

(10) Patent No.: US 10,458,247 B2
(45) Date of Patent: Oct. 29, 2019

(54) STATOR OF AN AIRCRAFT TURBINE ENGINE

(71) Applicant: SAFRAN AIRCRAFT ENGINES, Paris (FR)

(72) Inventors: Simon Pierre Claude Charbonnier, Moissy-Cramayel (FR); Matthieu Yoann Perrier, Moissy-Cramayel (FR)

(73) Assignee: SAFRAN AIRCRAFT ENGINES, Paris (FR)

(*) Notice: Subject to any disclaimer, the term of this patent is extended or adjusted under 35 U.S.C. 154(b) by 388 days.

(21) Appl. No.: 15/517,096

(22) PCT Filed: Sep. 29, 2015

(86) PCT No.: PCT/FR2015/052583
§ 371 (c)(1),
(2) Date: Apr. 5, 2017

(87) PCT Pub. No.: WO2016/055715
PCT Pub. Date: Apr. 14, 2016

(65) Prior Publication Data
US 2017/0298741 A1    Oct. 19, 2017

(30) Foreign Application Priority Data
Oct. 10, 2014    (FR) .................... 14 59721

(51) Int. Cl.
*F03B 1/04* (2006.01)
*F01D 5/14* (2006.01)
(Continued)

(52) U.S. Cl.
CPC ............. *F01D 5/142* (2013.01); *F01D 9/041* (2013.01); *F01D 17/162* (2013.01);
(Continued)

(58) Field of Classification Search
CPC ........ F01D 5/142; F01D 9/041; F01D 17/162; F01D 5/146; F01D 5/145; F02C 9/18;
(Continued)

(56) References Cited

U.S. PATENT DOCUMENTS 5,207,054 A    5/1993    Rodgers et al.
5,672,047 A    9/1997    Birkholz
(Continued)

FOREIGN PATENT DOCUMENTS

DE    102007035726 A1    2/2009
EP    0942150 A2    9/1999
(Continued)

OTHER PUBLICATIONS

Written Opinion of the International Searching Authority dated Oct. 13, 2016, issued in corresponding International Application No. PCT/FR2015/052583, filed Sep. 29, 2015, 5 pages.
(Continued)

*Primary Examiner* — Lindsay M Low
*Assistant Examiner* — James J Kim
(74) *Attorney, Agent, or Firm* — Christensen O'Connor Johnson Kindness PLLC

(57) ABSTRACT

A stator of an aircraft turbine engine, comprising an annular row of fixed vanes and an annular row of arms, wherein the trailing edges of the fixed vanes are positioned substantially in a first transverse plane that is positioned downstream of a second transverse plane that passes substantially through the leading edges of the arms.

8 Claims, 3 Drawing Sheets

(51) Int. Cl.
*F01D 9/04* (2006.01)
*F01D 17/16* (2006.01)
*F01D 25/16* (2006.01)
*F02C 9/18* (2006.01)
*F04D 29/54* (2006.01)
*F04D 29/56* (2006.01)

(52) U.S. Cl.
CPC .............. *F01D 25/162* (2013.01); *F02C 9/18* (2013.01); *F04D 29/544* (2013.01); *F04D 29/542* (2013.01); *F04D 29/563* (2013.01); *Y02T 50/671* (2013.01); *Y02T 50/673* (2013.01)

(58) Field of Classification Search
CPC .... F04D 29/542; F04D 29/544; F02D 29/563; Y02T 50/671; Y02T 50/673; F05D 2240/12
USPC .......................... 415/194, 161, 115, 148, 159
See application file for complete search history.

(56) References Cited

U.S. PATENT DOCUMENTS

| | | | | |
|---|---|---|---|---|
| 2001/0010798 A1* | 8/2001 | Dailey | .................... | F01D 5/146 415/159 |
| 2013/0051996 A1* | 2/2013 | Hoeger | .................... | F01D 9/06 415/185 |
| 2014/0314549 A1* | 10/2014 | Pakkala | .................... | F01D 9/02 415/148 |
| 2017/0022835 A1* | 1/2017 | Clark | ....................... | F01D 9/041 |
| 2017/0321602 A1* | 11/2017 | Guijarro Valencia | .... | F02C 7/14 |
| 2018/0306041 A1* | 10/2018 | Peters | .................... | F01D 9/041 |
| 2018/0335050 A1* | 11/2018 | Lurie | ....................... | F01D 5/146 |

FOREIGN PATENT DOCUMENTS

| | | |
|---|---|---|
| EP | 1298286 A2 | 4/2003 |
| GB | 2226600 A | 7/1990 |
| WO | 2005/119028 A1 | 12/2005 |

OTHER PUBLICATIONS

International Preliminary Report on Patentability dated Apr. 11, 2017, issued in corresponding International Application No. PCT/FR2015/052583, filed Sep. 29, 2015, 1 page.

International Search Report dated Oct. 13, 2016, issued in corresponding International Application No. PCT/FR2015/052583, filed Sep. 29, 2015, 3 pages.

Written Opinion of the International Searching Authority dated Oct. 13, 2016, issued in corresponding International Application No. PCT/FR2015/052583, filed Sep. 29, 2015, 6 pages.

* cited by examiner

STATOR OF AN AIRCRAFT TURBINE ENGINE

TECHNICAL FIELD

The present invention relates to a stator of an aircraft turbine engine, and in particular to a stator comprising at least one annular row of fixed vanes and one annular row of arms.

PRIOR ART

The prior art in particular includes WO-A1-2005/119028 and EP-A2-0 942 150.

In general, an aircraft turbine engine comprises, from upstream to downstream, in the direction of flow of the gases, a fan, at least one compressor, an annular combustion chamber, at least one turbine and a pipe for ejecting combustion gases.

For a bypass turbojet engine, the air flow that passes through the fan is divided into a primary flow which supplies the engine and a secondary flow which flows around the engine.

Conventionally, the engine comprises at least one stator and at least one rotor. For a multi-spool turbojet engine, the engine may for example comprise two rotors or spools, one being low pressure and the other high pressure. The turbojet engine may thus comprise a low-pressure spool having a first shaft connecting a low-pressure compressor to a low-pressure turbine, and a high-pressure spool having a second shaft connecting a high-pressure compressor to a high-pressure turbine.

The air entering the engine is compressed successively in the low-pressure compressor and the high-pressure compressor before being mixed with fuel which is burned in the combustion chamber. The combustion gases then expand in the high-pressure turbine and then the low-pressure turbine in order to rotate the low-pressure shaft, which in turn drives the fan shaft.

The stator of the turbine engine comprises structural annular casings, i.e. casings which are stiff enough to transmit forces. A turbine engine in particular comprises an inlet casing that extends downstream of the fan and an intermediate casing that extends between the low-pressure and high-pressure compressors.

In general, each of these stator casings comprises generally structural arms that extend substantially radially between two annular walls that are inner and outer, respectively, these arms being tubular in order for auxiliary systems to pass therethrough from the inside of the inner wall as far as the outside of the outer wall.

In order to reduce the consumption of the engines, some turbine engines comprise a reduction gear. The stators of these turbine engines generally comprise an annular row of fixed vanes upstream of the structural arms of the casing and an annular row of variable-pitch vanes downstream of the structural arms. The intermediate casing of this type of turbine engine, which is positioned downstream of the low-pressure compressor, thus comprises an annular row of structural arms, also referred to as primary arms, inserted between an annular row of fixed vanes (also referred to as inlet guide vanes (IGV)) and an annular row of variable-pitch vanes (also referred to as variable stator vanes (VSV)). The inlet casing, which is positioned upstream of the low-pressure compressor, also comprises an annular row of structural arms inserted between an annular row of fixed vanes and an annular row of variable-pitch vanes.

This type of stator having three successive rows of vanes and arms (two rows of vanes and one row of arms) is very disadvantageous since it has a negative impact on weight and drops in pressure due to its significant axial size.

The present invention provides a simple, effective and economical solution to this problem.

SUMMARY OF THE INVENTION

The invention proposes a stator of an aircraft turbine engine, comprising an annular row of fixed vanes and an annular row of arms, for example structural arms, said stator having an axis of revolution, characterised in that the trailing edges of the fixed vanes are positioned substantially in a first plane that is transverse to said axis of revolution and is positioned downstream of a second plane that is transverse to said axis of revolution and is positioned downstream of a second plane that is transverse to said axis and passes substantially through the leading edges of the arms, and the leading edges of the fixed vanes are positioned substantially in a third plane that is transverse to said axis of revolution and is positioned upstream of the second transverse plane, and in that it further comprises an annular row of variable-pitch vanes that is positioned directly downstream of the annular row of arms, the annular row of variable-pitch vanes comprising first variable-pitch vanes that are positioned substantially in the extension of the arms, and second variable-pitch vanes that are positioned between the first variable-pitch vanes, the first variable-pitch vanes having different aerodynamic profiles to those of the second variable-pitch vanes.

The invention makes it possible to reduce the axial size of a stator comprising an annular row of fixed vanes and an annular row of arms by axially interlinking these rows at least in part. Therefore, by contrast with the prior art, in which the fixed vanes are positioned upstream of the arms, in this case the fixed vanes are positioned between the arms at least in part. The axial size of the stator can thus be considerably reduced compared with those from the prior art, and this has a positive effect on the weight and the drops in pressure through the stator.

Although the rows of fixed vanes and arms are arranged in a particular manner according to the invention, the parameters and the aerodynamic properties of the profiles of the vanes and the arms are advantageously retained. The arms therefore preferably retain their thicknesses, shapes and secondary functions for auxiliary systems to pass therethrough. The fixed vanes may retain their function of guiding the air flow (which is discharged from the fan of the turbine engine, for example). This makes it possible to retain the speed triangles upstream and downstream of the stator.

The invention makes it possible to improve the aerodynamic performance of the stator in the different flight phases. Indeed, offsetting the leading edges of the fixed vanes in the upstream direction relative to those of the arms means that it is easier for the flow to pass into the fixed vanes. This also makes it possible to lessen the deflection of the flow at the outlet of the fan by preventing said flow from being directly deflected by the arms. Therefore, there is less of a drop in pressure, and the performance of the turbine engine is improved thereby.

In the present application, "transverse plane" means a plane that is substantially perpendicular to the longitudinal axis or the axis of revolution of the stator, which is generally the longitudinal axis of the turbine engine.

Advantageously, the central longitudinal planes of the arms are inclined relative to the longitudinal axis of the stator. The central longitudinal planes of at least some of the arms and of at least some of the fixed vanes are preferably substantially parallel or slightly inclined. This makes it easier to interlink the row of vanes with the row of arms.

The inclination or pitch of the arms makes it possible to further reduce the axial size of the stator without reducing the actual chord of the arms, and therefore without modifying the thickness thereof (the thickness/chord ratio as well as the number and distribution of the arms can thus be retained in comparison with the prior art).

The stator further comprises an annular row of variable-pitch vanes that is positioned directly downstream of the annular row of arms. As in the above-mentioned case, the stator according to the invention thus comprises two rows of vanes and one row of arms.

The annular row of variable-pitch vanes comprises first variable-pitch vanes that are positioned substantially in the extension of the arms, and second variable-pitch vanes that are positioned between the first variable-pitch vanes. The first variable-pitch vanes have different aerodynamic profiles to those of the second variable-pitch vanes. Advantageously, the first variable-pitch vanes have aerodynamic profiles or curvatures that are more accentuated than those of the second variable-pitch vanes.

Interlinking the fixed vanes between the arms has an impact on the aerodynamic performance of the stator because the speed triangle is not constant in azimuth downstream of the arms. In order to overcome this drawback, the variable-pitch vanes positioned downstream of the arms have profiles that are not all identical. Two different profiles are used depending on whether the vane is directly downstream of an arm or downstream of a fixed vane.

The leading edges of the first variable-pitch vanes are preferably positioned as closely as possible to the trailing edges of the arms so as to further reduce the axial size of the stator, but also so that these first vanes act as "flaps" that ensure that the low-pressure and high-pressure compressors operate under all flight conditions.

The stator may comprise two annular walls that are inner and outer, respectively, between which the rows of fixed vanes and arms extend.

Each variable-pitch vane may comprise, at its outer radial end, a cylindrical pivot that is mounted in a duct on the outer wall.

The outer wall may comprise, upstream of the arms, an annular row of discharge air through-slots and means, which are preferably controllable, for closing said slots. The slots and the closing means form a discharge valve that is also referred to as a variable bleed valve (VBV).

In a variant, the outer wall comprises, between the arms, at least one discharge air through-opening and at least one door, which is preferably controllable, for closing said opening.

In a particular embodiment of the invention, the invention can be estimated to reduce the weight of the module by 5 to 10% using a casing of this type. This is mainly explained by the reduction in axial length (and therefore the reduction in the inner and outer casing walls in the primary and secondary flow), linked to the integration of the fixed vanes between the arms, the reduction in axial clearances (in particular that between the rows of arms and of variable-pitch vanes), and the pitch of the arms (which may be between 20 and 30°, which makes it possible to gain approximately 10% in chord, as opposed to 0° in the prior art).

An additional, unquantifiable benefit is the reduction in the weight of the pipelines and harnesses that extend around the fan casing, by reducing the distances travelled.

The present invention also relates to an aircraft turbine engine, such as a turbojet engine or turboprop engine, characterised in that it comprises at least one stator as described above. If the turbine engine comprises a fan and low-pressure and high-pressure compressors, the stator can be mounted between the fan and the low-pressure compressor and/or between the low-pressure and high-pressure compressors. Alternatively, when the turboprop engine comprises for example two contra-rotating external propellers, positioned in the vicinity of the downstream end of the turboprop engine in relation to the flow of the gases therein, the stator can be mounted at the inlet of the low-pressure compressor.

DESCRIPTION OF THE FIGURES

The invention will be better understood, and other details, features and advantages of the invention will become apparent upon reading the following description, given by way of non-limiting example and with reference to the accompanying drawings, in which.

DETAILED DESCRIPTION

Figure 1:
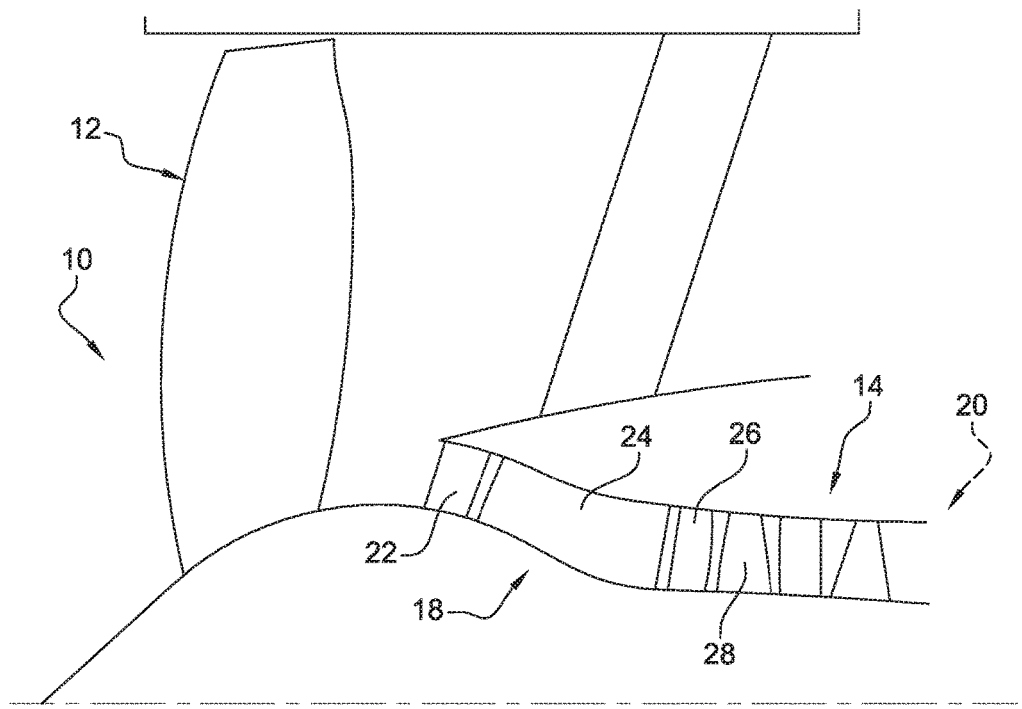
FIG. 1 is a schematic, axial sectional half view of an aircraft turbine engine according to the prior art, viewed from the side.

Reference is first made to FIG. 1, which shows a turbine engine 10 according to the prior art, said turbine engine 10 in this case being a bypass turbojet engine. The invention is described with reference to this example, but it is clear that the invention is applicable to other turbine engine architectures.

The turbine engine 10 comprises, from upstream to downstream, in the direction of flow of the gases, a fan 12 which generates a flow which divides into two coaxial flows, the primary flow powering the engine which comprises a low-pressure compressor 14, a high-pressure compressor (not shown), a combustion chamber (not shown), high-pressure and low-pressure turbines (not shown) and a pipe (not shown) for ejecting combustion gases.

These modules of the engine (fan, compressors, combustion chamber, turbines) are surrounded by structural annular stator casings. The turbine engine 10 thus comprises a plurality of successive annular casings, including an inlet casing 18 upstream of the low-pressure compressor 14, and an intermediate casing 20 between the low-pressure and high-pressure compressors.

The inlet casing 18 comprises an annular row of structural arms 24 (or primary arms) which is inserted between an annular row of fixed vanes 22 (or inlet guide vanes (IGV)) and an annular row of variable-pitch vanes 26 (or variable stator vanes (VSV)).

Figure 2:
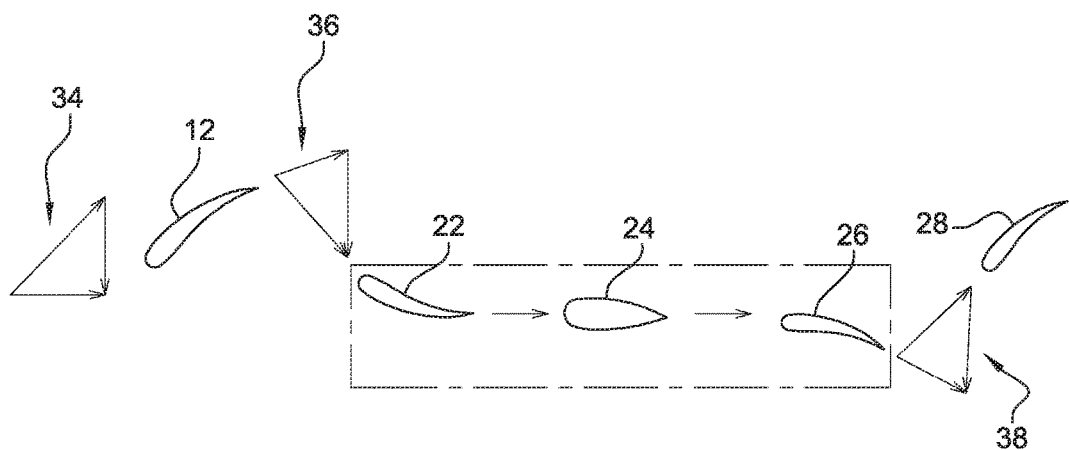
FIG. 2 is a highly schematic plan view of a part of the turbine engine from FIG. 1.

As can also be seen in FIG. 2, the row of fixed vanes 22 is positioned between the fan 12 and the row of arms 24, and the row of variable-pitch vanes 26 is positioned between the row of arms 24 and a movable rotor wheel 28 of the low-pressure compressor 14.

In the same way, the intermediate casing 20 comprises an annular row of structural arms (or primary arms) which is inserted between an annular row of fixed vanes (or inlet guide vanes (IGV)) and an annular row of variable-pitch vanes (or variable stator vanes (VSV)). The row of fixed vanes is positioned between a rotor wheel of the low-pressure compressor and the row of arms, and the row of variable-pitch vanes is positioned between the row of arms and a rotor wheel of the high-pressure compressor.

Reference numeral 34 in FIG. 2 represents the speed triangles of the air flow entering the fan 12, and reference numerals 36 and 38 represent the speed triangles of the primary air flow upstream of the fixed vanes 22 and downstream of the variable-pitch vanes 26.

As explained above, the inlet casing 18 and the intermediate casing 20 each form, axially together with the rows of vanes 22, 26, a bulky stator.

The invention makes it possible to overcome this problem by axially interlinking the row of fixed vanes with the row of arms of the stator.

Figure 3:
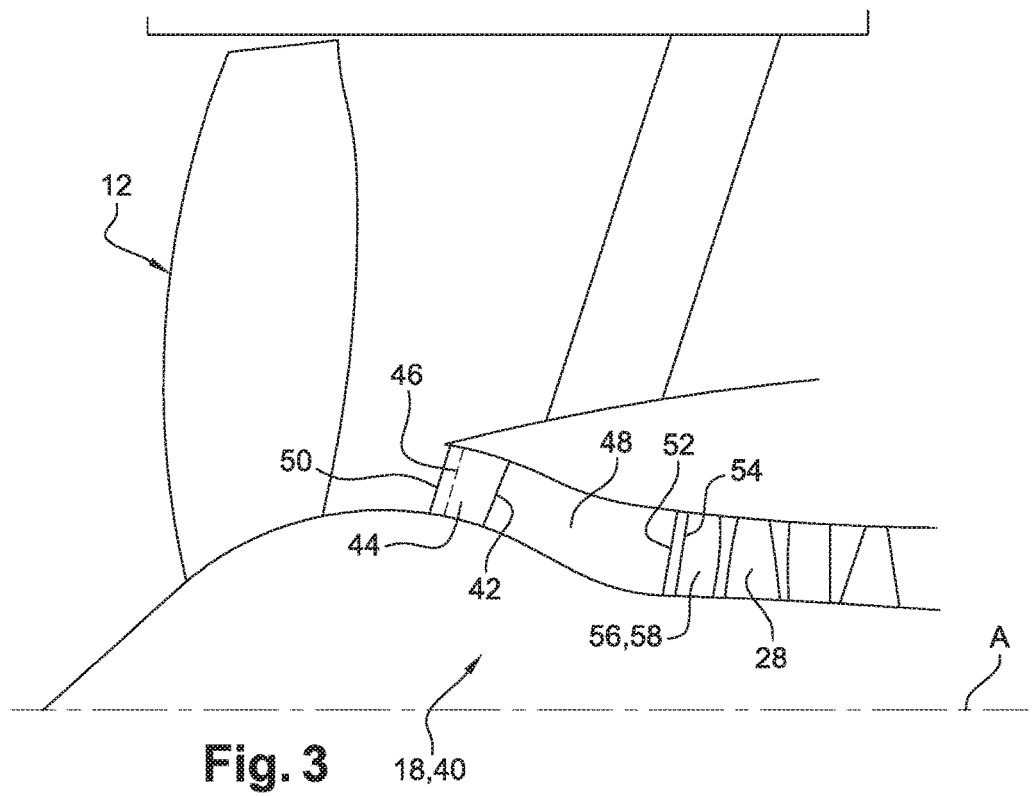
FIG. 3 is a schematic, axial sectional half view of an aircraft turbine engine according to the invention, viewed from the side.
Figure 4:
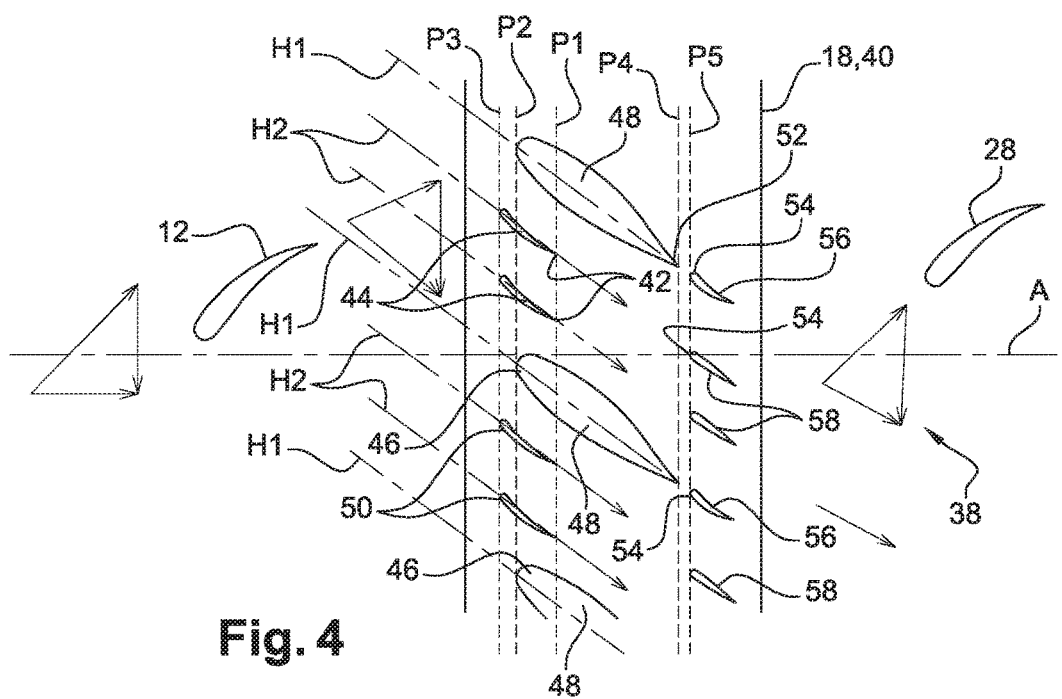
FIG. 4 is a highly schematic plan view of a part of the turbine engine from FIG. 3.

FIGS. 3 and 4 show an embodiment of a stator or inlet casing according to the invention, this embodiment of course also being applicable to an intermediate casing.

P1 denotes a transverse plane (perpendicular to the longitudinal axis A or axis of revolution of the stator 40 and of the turbine engine) passing substantially through the trailing edges 42 of the fixed vanes 44, P2 denotes a transverse plane passing substantially through the leading edges 46 of the arms 48, P3 denotes a transverse plane passing substantially through the leading edges 50 of the fixed vanes 44, P4 denotes a transverse plane passing substantially through the trailing edges 52 of the arms 48, and P5 denotes a transverse plane passing substantially through the leading edges 54 of the variable-pitch vanes 56, 58.

In the example shown, P1 is downstream of P2 which is downstream of P3. Moreover, P5 is downstream of P4 and at a short axial distance therefrom. The variable-pitch vanes 56, 58 are therefore positioned directly downstream of the arms 48.

In addition, H1 denotes a central longitudinal plane for each arm 48 and H2 denotes a central longitudinal plane for each fixed vane 44.

In this case, the planes H1 and H2 are inclined relative to the axis A and are substantially mutually parallel. In comparison with the prior art, the arms 48 therefore do not have an axial orientation, but are by contrast "provided with a pitch" (at an angle of 20-30°, for example) around an axis that is substantially radial relative to the axis A.

Each arm 48 is symmetrical to its plane H1. Each arm 48 is tubular in order to allow auxiliary systems to pass therethrough, and in addition it may be structural or non-structural. Each arm 48 preferably retains its dimensions, such as its chord and its thickness, in comparison with the prior art shown in FIGS. 1 and 2.

The fixed vanes 44 may be similar to those from the prior art.

The annular row of variable-pitch vanes 56, 58 comprises first vanes 56 that are in the extension of the arms 48 and second vanes 58 that are positioned between the first vanes 56 and downstream of the fixed vanes 44 in relation to the flow.

As schematically shown in the drawings, the profiles of the vanes 56 are more accentuated than those of the vanes 58. The portion of the air flow that flows through the fixed vanes 44 is deflected to a greater extent than the portion of the air flow flowing along the arms 48 due to the curvature of the profile of the fixed vanes 44. So that the air flow leaving the stator is homogenous over its entire circumference, it is necessary for the portion of the air flow flowing from the trailing edges of the arms 48 to be deflected to a greater extent than that flowing from the trailing edges of the fixed vanes 44. The profiles of the vanes 56, 58 are therefore configured so that the portion of the air flow flowing from the trailing edges of the arms 48 is deflected to a greater extent than that flowing from the trailing edges of the fixed vanes 44, and so that the air flow leaving the stator is homogenous over its entire circumference. This air flow advantageously has a speed triangle 38 that is substantially identical to that from the prior art (FIG. 2), such that the air flow over the rotor wheel 28 positioned downstream is not impacted by the configuration of the stator/inlet casing according to the invention.

Figure 5:
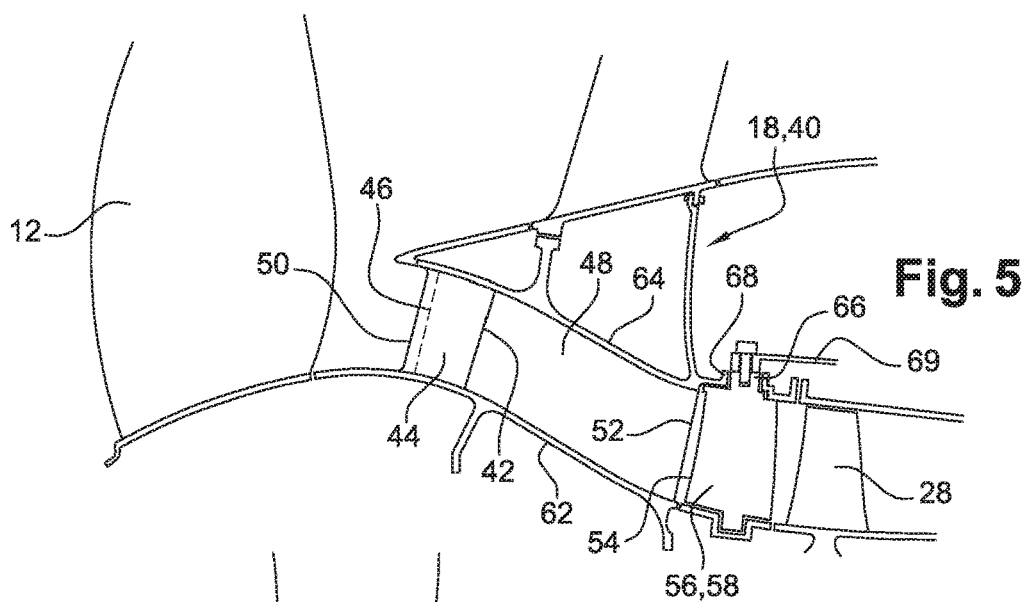
FIG. 5 is a view corresponding to FIG. 3 that shows an embodiment of an inlet casing according to the invention.

Reference is now made to FIG. 5, which shows a more specific embodiment of a stator 40 according to the invention, which in this case is an inlet casing 18.

As in the above-mentioned example, the stator 40 comprises rows of fixed vanes 44, rows of arms 48 and rows of variable-pitch vanes 56, 58, said variable-pitch vanes having two different profiles. These rows of vanes 44, 56, 58 and rows of arms 48 extend between two coaxial annular walls, which are inner 62 and outer 64, respectively.

Each variable-pitch vane 56, 58 comprises, at its outer radial end, a cylindrical pivot 66 that is mounted in a duct 68 on the outer wall 64 and is connected to a control ring (not shown) by a connecting rod 69 in order to position the vane 56, 58 about the axis defined by its pivot 66.

Figure 6:
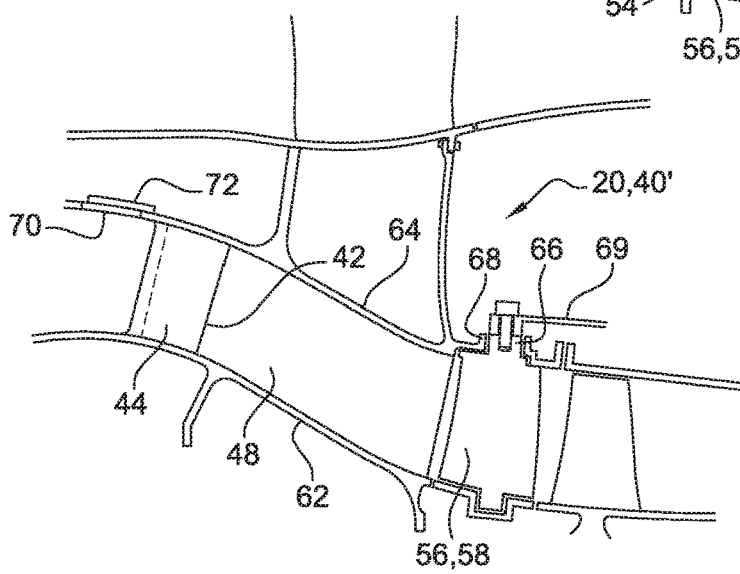
FIGS. 6 and 7 are views corresponding to FIG. 3 that show variants of an intermediate casing according to the invention.
Figure 7:
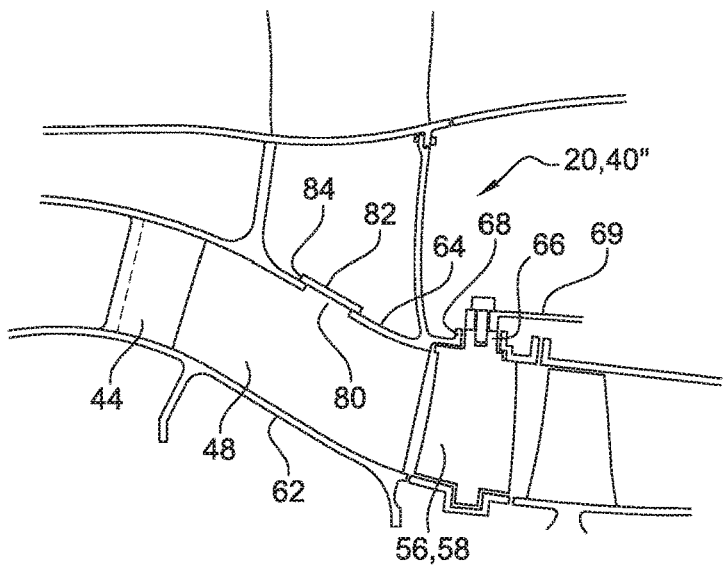

Reference is now made to FIGS. 6 and 7, which show variants of stators 40', 40" according to the invention, which are intermediate casings 20 in this case.

As in the above-mentioned example, each stator 40', 40" comprises rows of fixed vanes 44, rows of arms 48 and rows of variable-pitch vanes 56, 58 having two different profiles. These rows of vanes 44, 56, 58 and rows of arms 48 extend between two coaxial annular walls, which are inner 62 and outer 64, respectively. Each variable-pitch vane 56, 58 comprises, at its outer radial end, a cylindrical pivot 66 that is mounted in a duct 68 on the outer wall 64 and is connected to a control ring (not shown) by a connecting rod 69 in order to position the vane 56, 58 about the axis defined by its pivot 66.

In addition, the outer wall 64 further comprises means for discharging air. For FIG. 6, the outer wall 64 comprises, upstream of the arms 48, an annular row of discharge air through-slots 70 and means 72 for closing said slots 70. For FIG. 7, the outer wall 64 comprises, between the arms 48, at least one air through-opening 80 and at least one door 82 for closing said opening 80, the door 82 in this case being mounted so as to pivot about an articulation shaft 84. This articulation shaft 84 is positioned at an upstream end of the door 82 and is, for example, substantially tangential to a circumference centred on the longitudinal axis of the stator 40".

Preferably, the stator 40, 40', 40" according to the invention is integrally formed, i.e. formed in one piece, of course with the exception of the variable-pitch vanes, which have to remain movable. The stator can be produced in a plurality of steps, for example from a blank casting that is machined and then machine-welded.

The invention claimed is:

1. A stator of an aircraft turbine engine, comprising an annular row of fixed vanes having leading edges and trailing edges and an annular row of arms having leading edges and trailing edges, the stator having an axis of revolution, wherein:

the trailing edges of the fixed vanes are positioned substantially in a first plane that is transverse to said axis of revolution and is positioned downstream of a second plane that is transverse to said axis of revolution and passes substantially through the leading edges of the arms, and the leading edges of the fixed vanes are positioned substantially in a third plane that is transverse to said axis of revolution and is positioned upstream of the second plane, and wherein the stator further comprises an annular row of variable-pitch vanes that is positioned directly downstream of the annular row of arms, the annular row of variable-pitch vanes comprising first variable-pitch vanes that are positioned substantially along an extension of a chord of the arms, and second variable-pitch vanes that are each positioned between a corresponding two of the first variable-pitch vanes, the first variable-pitch vanes having different aerodynamic profiles than the second variable-pitch vanes.

2. The stator according to claim 1, wherein the arms are inclined relative to the axis of revolution of the stator.

3. The stator according to claim 2, wherein the arms and the fixed vanes are substantially parallel.

4. The stator according to claim 1, further comprising two annular walls that are inner wall and outer wall, respectively, between which the rows of fixed vanes and arms extend.

5. The stator according to claim 4, wherein each variable-pitch vane comprises, at its outer radial end, a cylindrical pivot that is mounted in a duct on the outer wall.

6. The stator according to claim 4, wherein the outer wall comprises:

upstream of the arms, an annular row of discharge air through-slots and means for closing said slots, or between the arms, at least one discharge air through-opening and at least one door for closing said through-opening.

7. The stator according to claim 1, wherein the first variable-pitch vanes have aerodynamic profiles or curvatures that are more accentuated than those of the second variable-pitch vanes.

8. An aircraft turbine engine comprising at least one stator according to claim 1.

* * * * *